US012621620B2

(12) United States Patent
Moriya et al.

(10) Patent No.: US 12,621,620 B2
(45) Date of Patent: May 5, 2026

(54) SOUND SIGNAL DOWNMIX METHOD, SOUND SIGNAL CODING METHOD, SOUND SIGNAL DOWNMIX APPARATUS, SOUND SIGNAL CODING APPARATUS, PROGRAM

(71) Applicant: NTT, Inc.

(72) Inventors: Takehiro Moriya, Tokyo (JP); Yutaka Kamamoto, Tokyo (JP); Ryosuke Sugiura, Tokyo (JP)

(73) Assignee: NTT, Inc., Tokyo (JP)

( * ) Notice: Subject to any disclaimer, the term of this patent is extended or adjusted under 35 U.S.C. 154(b) by 112 days.

(21) Appl. No.: 18/685,762

(22) PCT Filed: Sep. 1, 2021

(86) PCT No.: PCT/JP2021/032080
§ 371 (c)(1),
(2) Date: Feb. 22, 2024

(87) PCT Pub. No.: WO2023/032065
PCT Pub. Date: Mar. 9, 2023

(65) Prior Publication Data
US 2025/0126424 A1 Apr. 17, 2025

(51) Int. Cl.
*H04S 1/00* (2006.01)
*G10L 19/008* (2013.01)

(52) U.S. Cl.
CPC ............ *H04S 1/007* (2013.01); *G10L 19/008* (2013.01)

(58) Field of Classification Search
CPC . H04S 1/007; H04S 1/00; H04S 3/008; H04S 3/00; H04S 3/004; H04S 5/005; H04S 2400/03; G10L 19/02; G10L 19/008; G10L 19/08; H04R 3/04; H04R 3/02; H04R 5/00
USPC ................................ 381/1–23; 704/500–504
See application file for complete search history.

(56) References Cited

U.S. PATENT DOCUMENTS

| | | | | |
|---|---|---|---|---|
| 3,943,293 A * | 3/1976 | Bailey | H03G 5/18 381/13 |
| 2008/0010072 A1 * | 1/2008 | Yoshida | G10L 19/008 704/E19.044 |
| 2012/0072207 A1 * | 3/2012 | Morii | G10L 19/008 704/201 |

(Continued)

FOREIGN PATENT DOCUMENTS

| | | |
|---|---|---|
| EP | 4120249 B1 | 1/2023 |
| EP | 4120250 A1 | 1/2023 |
| WO | 2006/070751 A1 | 7/2006 |

*Primary Examiner* — Leshui Zhang

(57) ABSTRACT

A sound signal downmixing method includes a step of obtaining, for each of two channels, a signal obtained by adding an input sound signal of one channel to a signal obtained by delaying an input sound signal of the other channel and multiplying the delayed input sound signal by a weight value as a delayed crosstalk-added signal of the one channel, a step of obtaining preceding channel information and a left-right correlation value, and step of obtaining a downmix signal by performing weighted addition on the input sound signals of the two channels based on the left-right correlation value and the preceding channel information such that more of a signal derived from an input sound signal of a preceding channel among the signals derived from the input sound signals of the two channels is included as the left-right correlation value becomes larger.

10 Claims, 9 Drawing Sheets

(56) References Cited

U.S. PATENT DOCUMENTS

2014/0010375 A1* 1/2014 Usher .................... H04S 5/00
381/27

* cited by examiner

SOUND SIGNAL DOWNMIX METHOD, SOUND SIGNAL CODING METHOD, SOUND SIGNAL DOWNMIX APPARATUS, SOUND SIGNAL CODING APPARATUS, PROGRAM

CROSS-REFERENCE TO RELATED APPLICATIONS

This application is a U.S. 371 Application of International Patent Application No. PCT/JP2021/032080, filed on 1 Sep. 2021, the disclosure of which is hereby incorporated herein by reference in its entirety.

TECHNICAL FIELD

The present invention relates to a technique for obtaining a monaural sound signal from a two-channel sound signal in order to encode the sound signal in monaural, encode the sound signal by using both monaural encoding and stereo encoding, process the sound signal in monaural, or perform signal processing using a monaural sound signal for a stereo sound signal.

BACKGROUND ART

As a technique for obtaining a monaural sound signal from a two-channel sound signal and embedded encoding/decoding the two-channel sound signal and the monaural sound signal, there is a technique of Patent Literature 1. Patent Literature 1 discloses a technique for obtaining a monaural signal by averaging an input left channel sound signal and an input right channel sound signal for each corresponding sample, encoding (monaural encoding) the monaural signal to obtain a monaural code, decoding (monaural decoding) the monaural code to obtain a monaural local decoded signal, and encoding a difference (prediction residual signal) between the input sound signal and a prediction signal obtained from the monaural local decoded signal for each of the left channel and the right channel. In the technique of Patent Literature 1, for each channel, a signal obtained by delaying a monaural local decoded signal and giving an amplitude ratio is used as a prediction signal, and a prediction signal having a delay and an amplitude ratio that minimize an error between an input sound signal and the prediction signal is selected or a prediction signal having a delay and an amplitude ratio that maximize cross-correlation between the input sound signal and the monaural local decoded signal is used to subtract the prediction signal from the input sound signal to obtain a prediction residual signal, and the prediction residual signal is set as an encoding/decoding target, thereby suppressing sound quality deterioration of the decoded sound signal of each channel.

CITATION LIST

Patent Literature

Patent Literature 1: WO 2006/070751 A

SUMMARY OF INVENTION

Technical Problem

In the technique of Patent Literature 1, the coding efficiency of each channel can be improved by optimizing the delay and the amplitude ratio given to the monaural local decoded signal when obtaining the prediction signal. However, in the technique of Patent Literature 1, the monaural local decoded signal is obtained by encoding and decoding a monaural signal obtained by averaging a left channel sound signal and a right channel sound signal. That is, the technique of Patent Literature 1 has a problem that it is not devised to obtain a monaural signal useful for signal processing such as encoding processing from a two-channel sound signal.

An object of the present invention is to provide a technique for obtaining a monaural signal useful for signal processing such as encoding processing from a two-channel sound signal.

Solution to Problem

One aspect of the present invention is a sound signal downmixing method for obtaining a downmix signal that is a monaural sound signal from input sound signals of two channels, the method including: a delayed crosstalk addition step of obtaining, for each of the two channels, a signal obtained by adding an input sound signal of one channel to a signal obtained by delaying an input sound signal of the other channel and multiplying the delayed input sound signal by a weight value that is a predetermined value having an absolute value smaller than 1, as a delayed crosstalk-added signal of the one channel; a left-right relationship information acquisition step of obtaining preceding channel information that is information indicating which of the delayed crosstalk-added signals of the two channels is preceding and a left-right correlation value that is a value indicating a magnitude of correlation between the delayed crosstalk-added signals of the two channels; and a downmixing step of obtaining the downmix signal by performing weighted addition on the input sound signals of the two channels based on the left-right correlation value and the preceding channel information such that more of an input sound signal of a preceding channel among the input sound signals of the two channels is included as the left-right correlation value becomes larger.

One aspect of the present invention is a sound signal encoding method including the above sound signal downmixing method as a sound signal downmixing step, in which the sound signal encoding method includes: a monaural encoding step of encoding the downmix signal obtained in the downmixing step to obtain a monaural code; and a stereo encoding step of encoding the input sound signals of the two channels to obtain a stereo code.

Advantageous Effects of Invention

According to the present invention, it is possible to obtain a monaural signal useful for signal processing such as encoding processing from a two-channel sound signal.

DESCRIPTION OF EMBODIMENTS

First Embodiment

Figure 1:
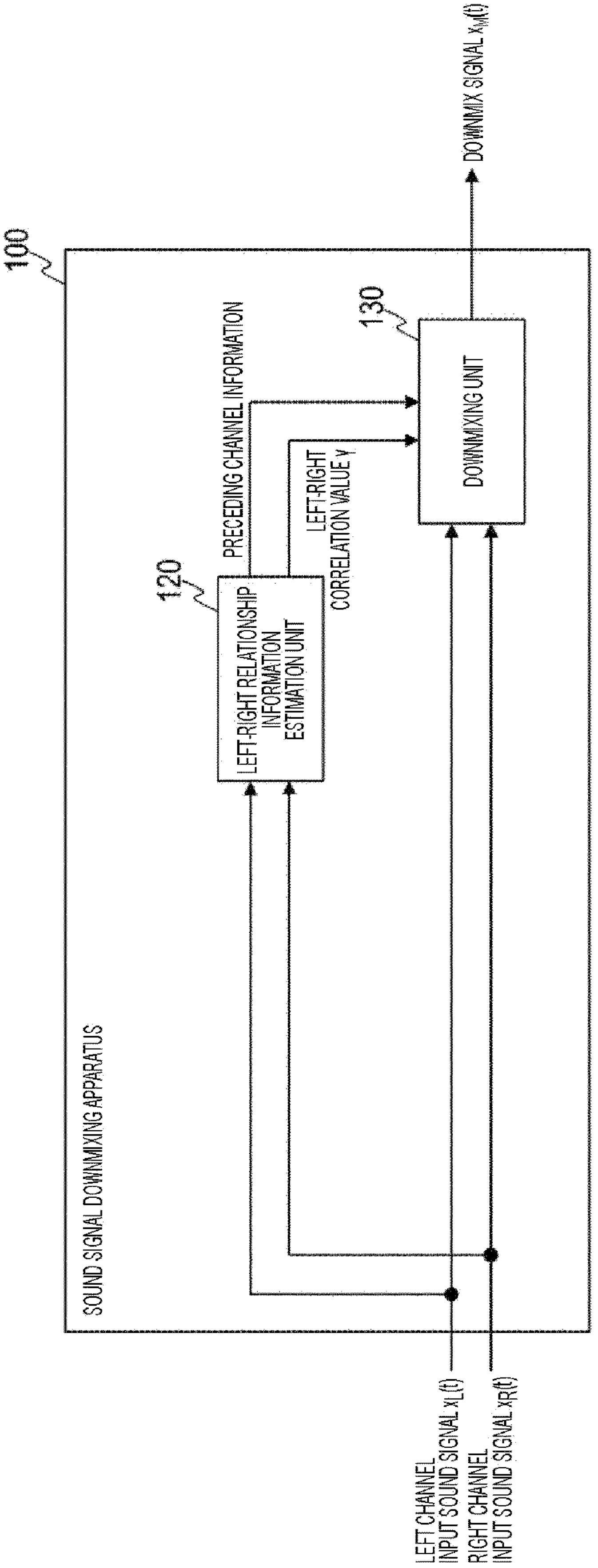
FIG. 1 is a block diagram illustrating a sound signal downmixing apparatus according to a first embodiment.

Two-channel sound signals to be subjected to signal processing such as encoding processing are often digital sound signals obtained by performing AD conversion on sound collected by a left channel microphone and a right channel microphone disposed in a certain space. In this case, what are input to an apparatus that performs signal processing such as encoding processing are a left channel input sound signal that is a digital sound signal obtained by performing AD conversion on sound collected by the left channel microphone disposed in the space and a right channel input sound signal that is a digital sound signal obtained by performing AD conversion on sound collected by the right channel microphone disposed in the space. The left channel input sound signal and the right channel input sound signal often include the sound emitted by each sound source existing in the space in a state in which a difference (so-called arrival time difference) between an arrival time from the sound source at the left channel microphone and an arrival time from the sound source at the right channel microphone is given.

In the technique of Patent Literature 1 described above, a signal obtained by delaying a monaural local decoded signal and giving an amplitude ratio is used as a prediction signal, the prediction signal is subtracted from an input sound signal to obtain a prediction residual signal, and the prediction residual signal is set as an encoding/decoding target. That is, the more similar the input sound signal and the monaural local decoded signal are, the more efficient the encoding can be performed for each channel. However, for example, assuming that only sound emitted by one sound source existing in a certain space is included in a state in which an arrival time difference is given to the left channel input sound signal and the right channel input sound signal, in a case where the monaural local decoded signal is obtained by encoding and decoding a monaural signal obtained by averaging the left channel input sound signal and the right channel input sound signal, although only sound emitted by the same one sound source is included in the left channel input sound signal, the right channel input sound signal, and the monaural local decoded signal, the degree of similarity between the left channel input sound signal and the monaural local decoded signal is not extremely high, and the degree of similarity between the right channel input sound signal and the monaural local decoded signal is also not extremely high. In this way, if a monaural signal is obtained by simply averaging the left channel input sound signal and the right channel input sound signal, a monaural signal useful for signal processing such as encoding processing may not be obtained.

Therefore, a sound signal downmixing apparatus according to a first embodiment performs downmixing processing in consideration of the relationship between the left channel input sound signal and the right channel input sound signal in order to obtain a monaural signal useful for signal processing such as encoding processing. Hereinafter, a sound signal downmixing apparatus according to a first embodiment will be described.

Figure 2:
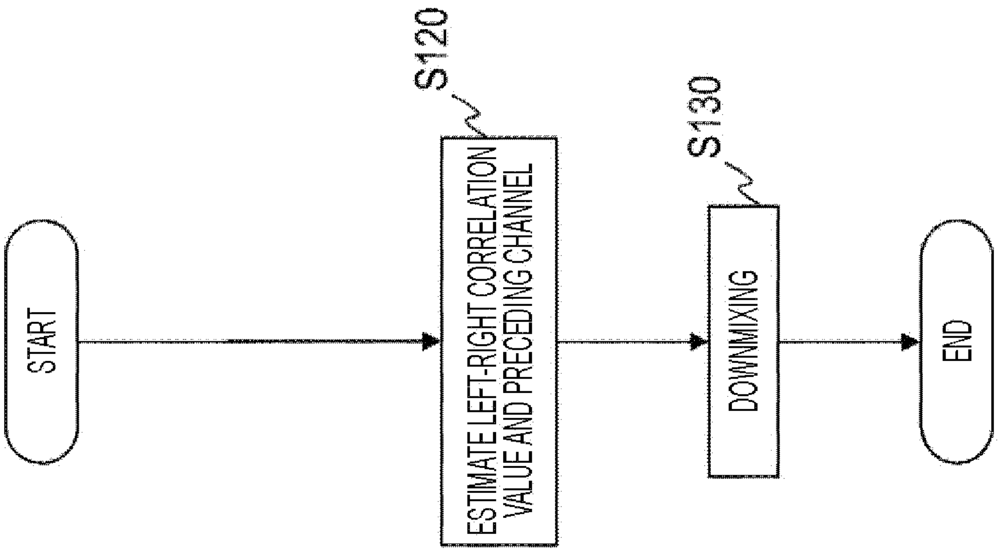
FIG. 2 is a flowchart illustrating processing of the sound signal downmixing apparatus according to the first embodiment.

As illustrated in FIG. 1, a sound signal downmixing apparatus 100 according to the first embodiment includes a left-right relationship information estimation unit 120 and a downmixing unit 130. The sound signal downmixing apparatus 100 obtains and outputs a downmix signal to be described later from an input sound signal in a time domain of two-channel stereo in units of frames having a predetermined time length of 20 ms, for example. What is input to the sound signal downmixing apparatus 100 is a sound signal in the time domain of two-channel stereo, and is, for example, a digital sound signal obtained by collecting and AD-converting sound such as vocal sound and music with each of two microphones, a digital decoded sound signal obtained by encoding and decoding the digital sound signal described above, and a digital signal-processed sound signal obtained by performing signal processing on the digital sound signal described above, and includes a left channel input sound signal and a right channel input sound signal. A downmix signal that is a monaural sound signal in the time domain obtained by the sound signal downmixing apparatus 100 is input to a sound signal encoding apparatus that encodes at least the downmix signal or a sound signal processing apparatus that performs signal processing on at least the downmix signal. When the number of samples per frame is T, left channel input sound signals $x_L(1), x_L(2), \ldots, x_L(T)$ and right channel input sound signals $x_R(1), x_R(2), \ldots, x_R(T)$ are input to the sound signal downmixing apparatus 100 in units of frames, and the sound signal downmixing apparatus 100 obtains and outputs downmix signals $x_M(1), x_M(2), \ldots, x_M(T)$ in units of frames. Here, T is a positive integer, and for example, if the frame length is 20 ms and the sampling frequency is 32 kHz, T is 640. The sound signal downmixing apparatus 100 performs the processing of steps S120 and S130 illustrated in FIG. 2 for each frame.

[Left-Right Relationship Information Estimation Unit 120]

The left-right relationship information estimation unit 120 receives the left channel input sound signal input to the sound signal downmixing apparatus 100 and the right channel input sound signal input to the sound signal downmixing apparatus 100. The left-right relationship information estimation unit 120 obtains and outputs a left-right correlation value $\gamma$ and preceding channel information from the left channel input sound signal and the right channel input sound signal (step S120).

Preceding channel information is information corresponding to at which of the left channel microphone disposed in a space and the right channel microphone disposed in the space sound emitted by a main sound source in the space arrives earlier. That is, the preceding channel information is information indicating in which of the left channel input sound signal and the right channel input sound signal the same sound signal is included first. If it is said that the left channel is preceding or the right channel is following in a case where the same sound signal is included earlier in the left channel input sound signal, and it is said that the right channel is preceding or the left channel is following in a case where the same sound signal is included earlier in the right channel input sound signal, the preceding channel information is information indicating which of the left channel and the right channel is preceding. The left-right correlation value $\gamma$ is a correlation value considering a time difference between the left channel input sound signal and the right channel input sound signal. That is, the left-right correlation value $\gamma$ is a value representing the magnitude of the correlation between a sample string of the input sound signal of the preceding channel and a sample string of the input sound signal of the following channel at a position shifted behind the sample string by $\tau$ samples. Hereinafter, this T is also referred to as a left-right time difference. Since the preceding channel information and the left-right correlation value $\gamma$ are information indicating the relationship between the left channel input sound signal and the right channel input sound signal, they can also be referred to as left-right relationship information.

For example, if an absolute value of a correlation coefficient is used as a value representing the magnitude of the correlation, the left-right relationship information estimation unit 120 obtains and outputs, as the left-right correlation value $\gamma$, the maximum value of absolute values $\gamma_{cand}$ of the correlation coefficient between the sample string of the left channel input sound signal and the sample string of the right channel input sound signal at a position shifted behind the sample string by the number of candidate samples $\tau_{cand}$ for each predetermined number of candidate samples $\tau_{cand}$ from $\tau_{max}$ to $\tau_{min}$ (for example, $\tau_{max}$ is a positive number, and $\tau_{min}$ is a negative number), obtains and outputs information indicating that the left channel is preceding as the preceding channel information in a case where $\tau_{cand}$ when the absolute value of the correlation coefficient is the maximum value is a positive value, and obtains and outputs information indicating that the right channel is preceding as the preceding channel information in a case where $\tau_{cand}$ when the absolute value of the correlation coefficient is the maximum value is a negative value. In a case where $\tau_{cand}$ when the absolute value of the correlation coefficient is the maximum value is zero, the left-right relationship information estimation unit 120 may obtain and output the information indicating that the left channel is preceding as the preceding channel information, or may obtain and output the information indicating that the right channel is preceding as the preceding channel information, but may obtain and output information indicating that none of the channels is preceding as the preceding channel information.

Each predetermined number of candidate samples may be an integer value from $\tau_{max}$ to $\tau_{min}$, may include a fractional value or a decimal value between $\tau_{max}$ and $\tau_{min}$, or may not include any integer value between $\tau_{max}$ and $\tau_{min}$. In addition, $\tau_{max}=-\tau_{min}$ may be satisfied or may not be satisfied. Assuming that a target is an input sound signal whose preceding channel is unknown, it is preferable that $\tau_{max}$ be a positive number and $\tau_{min}$ be a negative number. Note that, one or more samples of past input sound signals continuous with the sample string of the input sound signal of the current frame may also be used in order to calculate the absolute value $\gamma_{cand}$ of the correlation coefficient, and in this case, the sample string of the input sound signal of the past frame may be stored in a storage unit (not illustrated) in the left-right relationship information estimation unit 120 by a predetermined number of frames.

Furthermore, for example, instead of the absolute value of the correlation coefficient, a correlation value using information of the phase of the signal may be set as $\gamma_{cand}$ as follows. In this example, the left-right relationship information estimation unit 120 first performs Fourier transform on each of the left channel input sound signals $x_L(1)$, $x_L(2)$, . . . , $x_L(T)$ and the right channel input sound signals $x_R(1)$, $x_R(2)$, . . . , $x_R(T)$ as in the following Expressions (1-1) and (1-2) to obtain frequency spectra $X_L(k)$ and $X_R(k)$ at each frequency k from 0 to T−1.

[Math. 1]

$$X_L(k) = \frac{1}{\sqrt{T}} \sum_{t=0}^{T-1} x_L(t+1)e^{-j\frac{2\pi kt}{T}} \quad (1\text{-}1)$$

[Math. 2]

$$X_R(k) = \frac{1}{\sqrt{T}} \sum_{t=0}^{T-1} x_R(t+1)e^{-j\frac{2\pi kt}{T}} \quad (1\text{-}2)$$

Next, the left-right relationship information estimation unit 120 obtains a spectrum $\varphi(k)$ of a phase difference at each frequency k by the following Expression (1-3) using the frequency spectra $X_L(k)$ and $X_R(k)$ at each frequency k obtained by Expressions (1-1) and (1-2).

[Math. 3]

$$\phi(k) = \frac{X_L(k)/|X_L(k)|}{X_R(k)/|X_R(k)|} \quad (1\text{-}3)$$

Next, the left-right relationship information estimation unit 120 performs inverse Fourier transform on the spectrum of the phase difference obtained by Expression (1-3) to obtain a phase difference signal $\psi(\tau_{cand})$ for each number of candidate samples $\tau_{cand}$ from $\tau_{max}$ to $\tau_{min}$ as in the following Expression (1-4).

[Math. 4]

$$\psi(\tau_{cand}) = \frac{1}{\sqrt{T}} \sum_{k=0}^{T-1} \phi(k)e^{j\frac{2\pi k\tau_{cand}}{T}} \quad (1\text{-}4)$$

Since the absolute value of the phase difference signal $\psi(\tau_{cand})$ obtained by Expression (1-4) represents a kind of correlation corresponding to the likelihood of the time difference between the left channel input sound signals $x_L(1)$, $x_L(2)$, . . . , $x_L(T)$ and the right channel input sound signals $x_R(1)$, $x_R(2)$, . . . , x(T), the left-right relationship information estimation unit 120 uses the absolute value of the phase difference signal $\psi(\tau_{cand})$ with respect to each number of candidate samples $\tau_{cand}$ as a correlation value $\gamma_{cand}$. That is, the left-right relationship information estimation unit 120 obtains and outputs the maximum value of the correlation value $\gamma_{cand}$ that is the absolute value of the phase difference signal $\psi(\tau_{cand})$ as the left-right correlation value $\gamma$, obtains and outputs information indicating that the left channel is preceding as the preceding channel information in a case where $\tau_{cand}$ when the correlation value is the maximum value is a positive value, and obtains and outputs information indicating that the right channel is preceding as the preceding channel information in a case where $\tau_{cand}$ when the correlation value is the maximum value is a negative value. In a case where $\tau_{cand}$ when the correlation value is the maximum value is zero, the left-right relationship information estimation unit 120 may obtain and output the information indicating that the left channel is preceding as the preceding channel information, or may obtain and output the information indicating that the right channel is preceding as the preceding channel information, but may obtain and output information indicating that none of the channels is preceding as the preceding channel information. Note that, instead of using the absolute value of the phase difference signal $\psi(\tau_{cand})$ without change as the correlation value $\gamma_{cand}$, the left-right relationship information estimation unit 120 may use a normalized value such as a relative difference between the absolute value of the phase difference signal $\psi(\tau_{cand})$ for each $\tau_{cand}$ and the average of the absolute values of the phase difference signals obtained for each of a plurality of numbers of candidate samples before and after $\tau_{cand}$. That is, the left-right relationship information estimation unit 120 may obtain an average value by the following Expression (1-5) using a predetermined positive number $\tau_{range}$ for each $\tau_{cand}$ and use a normalized correlation value obtained by the following Expression (1-6) as $\gamma_{cand}$ using the obtained average value $\psi_c(\tau_{cand})$ and the phase difference signal $\psi(\tau_{cand})$.

[Math. 5]

$$\psi_c(\tau_{cand}) = \frac{1}{2\tau_{range}+1}\sum_{\tau'=\tau_{cand}-\tau_{range}}^{\tau_{cand}+\tau_{range}} |\psi(\tau')| \qquad (1\text{-}5)$$

[Math. 6]

$$1 - \frac{\psi_c(\tau_{cand})}{|\psi(\tau_{cand})|} \qquad (1\text{-}6)$$

Note that the normalized correlation value obtained by Expression (1-6) is a value of 0 or more and 1 or less, and is a value indicating a property in which $\tau_{cand}$ is close to 1 as likely to be the left-right time difference and $\tau_{cand}$ is close to 0 as not likely to be the left-right time difference.

[Downmixing Unit 130]

The downmixing unit 130 receives the left channel input sound signal input to the sound signal downmixing apparatus 100, the right channel input sound signal input to the sound signal downmixing apparatus 100, the left-right correlation value $\gamma$ output from the left-right relationship information estimation unit 120, and the preceding channel information output from the left-right relationship information estimation unit 120. The downmixing unit 130 obtains and outputs a downmix signal by performing weighted addition on the left channel input sound signal and the right channel input sound signal such that more of the input sound signal of the preceding channel of the left channel input sound signal and the right channel input sound signal is included in the downmix signal as the left-right correlation value $\gamma$ becomes larger (step S130).

For example, if the absolute value or the normalized value of the correlation coefficient is used as the correlation value as in the example described above in the description of the left-right relationship information estimation unit 120, the left-right correlation value $\gamma$ input from the left-right relationship information estimation unit 120 is a value of 0 or more and 1 or less. Therefore, the downmixing unit 130 may obtain a downmix signal $x_M(t)$ by performing weighted addition on the left channel input sound signal $x_L(t)$ and the right channel input sound signal $x_R(t)$ using the weight determined by the left-right correlation value $\gamma$ for each corresponding sample number t. For example, the downmixing unit 130 may obtain the downmix signal $x_M(t)$ as $x_M(t)=((1+\gamma)/2)\times x_L(t)+((1-\gamma)/2)\times x_R(t)$ in a case where the preceding channel information is the information indicating that the left channel is preceding, that is, in a case where the left channel is preceding, and as $x_M(t)=((1-\gamma)/2)\times x_L(t)+((1+\gamma)/2)\times x_R(t)$ in a case where the preceding channel information is the information indicating that the right channel is preceding, that is, in a case where the right channel is preceding. When the downmixing unit 130 obtains the downmix signal in this way, the smaller the left-right correlation value $\gamma$, that is, the smaller the correlation between the left channel input sound signal and the right channel input sound signal, the closer the downmix signal is to the signal obtained by averaging the left channel input sound signal and the right channel input sound signal, and the larger the left-right correlation value $\gamma$, that is, the larger the correlation between the left channel input sound signal and the right channel input sound signal, the closer the downmix signal is to the input sound signal of the preceding channel of the left channel input sound signal and the right channel input sound signal.

Note that, in a case where none of the channels is preceding, the downmixing unit 130 preferably obtains and outputs a downmix signal by performing weighted addition on the left channel input sound signal and the right channel input sound signal such that the left channel input sound signal and the right channel input sound signal are included in the downmix signal with the same weight. That is, in a case where the preceding channel information indicates that none of the channels is preceding, for example, the downmixing unit 130 may obtain a downmix signal by performing weighted addition on the left channel input sound signal and the right channel input sound signal, and specifically, $x_M(t)=(x_L(t)+x_R(t))/2$ obtained by averaging the left channel input sound signal $x_L(t)$ and the right channel input sound signal $x_R(t)$ for each sample number t may be used as the downmix signal $x_M(t)$.

Second Embodiment

In a case where the left channel microphone and the right channel microphone are disposed at distant positions in the space and, for example, the sound source emitting the sound is close to the left channel microphone, the sound emitted by the sound source may be hardly included in the input sound signal collected by the right channel microphone. In such a case, the sound signal downmixing apparatus should obtain the left channel input sound signal as a downmix signal useful for signal processing such as encoding processing. However, in such a case, since the sound emitted from the sound source is hardly included in the right channel input sound signal, the sound signal downmixing apparatus 100 according to the first embodiment obtains the preceding channel information based on $\tau_{cand}$ at which the correlation value happens to be the maximum value, and if the preceding channel information is information indicating that the right channel is preceding, a downmix signal including the right channel input sound signal more than the left channel input sound signal is obtained. Furthermore, in such a case, the sound signal downmixing apparatus 100 according to the first embodiment may obtain a small value as the left-right correlation value $\gamma$, and may obtain a signal close to the average of the left channel input sound signal and the right channel input sound signal as the downmix signal. Furthermore, in such a case, the values of $\tau_{cand}$ at which the correlation value happens to be the maximum value and the left-right correlation value $\gamma$ may be greatly different for each frame, and the downmix signal obtained by the sound signal downmixing apparatus 100 according to the first embodiment may be greatly different for each frame. That is, in the sound signal downmixing apparatus 100 according to the first embodiment, there remains a problem that a downmix signal useful for signal processing such as encoding processing is not necessarily obtained in a case where one of the left channel input sound signal and the right channel input sound signal significantly includes sound emitted by a sound source, but the other of the left channel input sound signal and the right channel input sound signal does not significantly include sound emitted by a sound source. Even in a case where one of the left channel input sound signal and the right channel input sound signal significantly includes the sound emitted by the sound source and the other of the left channel input sound signal and the right channel input sound signal does not significantly include the sound emitted by the sound source, a sound signal downmixing apparatus according to a second embodiment can obtain a downmix signal useful for signal processing such as encoding processing. Hereinafter, a sound signal downmixing apparatus according to the second embodiment will be described focusing on differences from the sound signal downmixing apparatus according to the first embodiment.

Figure 3:
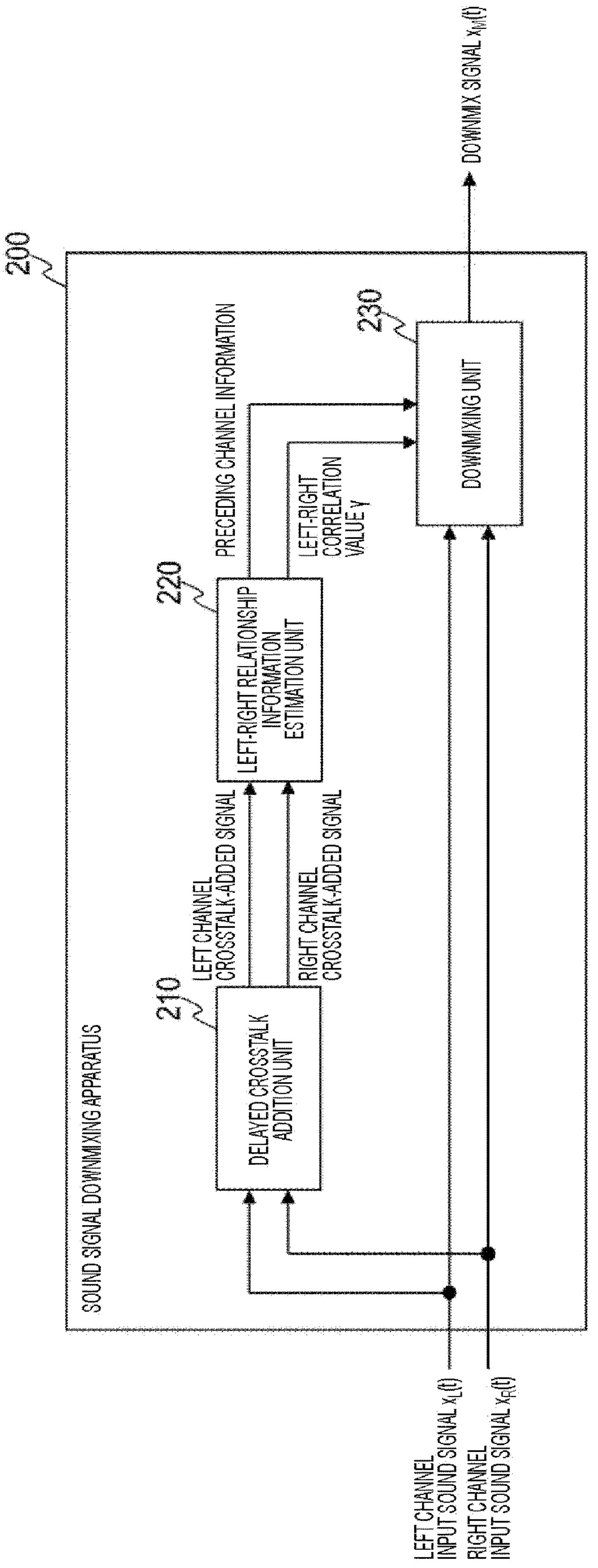
FIG. 3 is a block diagram illustrating an example of a sound signal downmixing apparatus according to a second embodiment.
Figure 4:
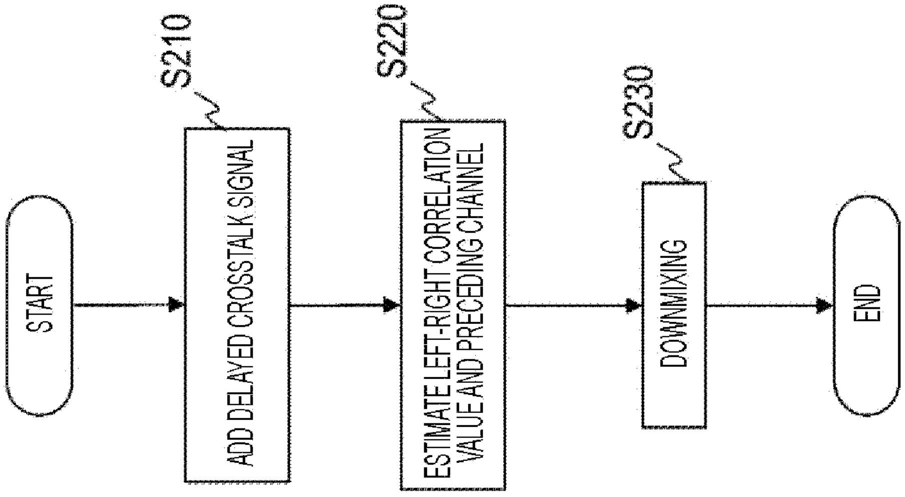
FIG. 4 is a flowchart illustrating an example of processing of the sound signal downmixing apparatus according to the second embodiment.

As illustrated in FIG. 3, a sound signal downmixing apparatus 200 includes a delayed crosstalk addition unit 210, a left-right relationship information estimation unit 220, and a downmixing unit 230. The sound signal downmixing apparatus 200 obtains and outputs a downmix signal to be described later from a left channel input sound signal and a right channel input sound signal which are input sound signals in the time domain of two-channel stereo in units of frames having a predetermined time length of 20 ms, for example. The sound signal downmixing apparatus 200 performs the processing of steps S210, S220, and S230 illustrated in FIG. 4 for each frame.

[Outline of Delayed Crosstalk Addition Unit 210]

The delayed crosstalk addition unit 210 receives the left channel input sound signal input to the sound signal downmixing apparatus 200 and the right channel input sound signal input to the sound signal downmixing apparatus 200. The delayed crosstalk addition unit 210 obtains and outputs a left channel delayed crosstalk-added signal and a right channel delayed crosstalk-added signal from the left channel input sound signal and the right channel input sound signal (step S210). The process in which the delayed crosstalk addition unit 210 obtains the left channel delayed crosstalk-added signal and the right channel delayed crosstalk-added signal will be described after the left-right relationship information estimation unit 220 and the downmixing unit 230 are described.

[Left-Right Relationship Information Estimation Unit 220]

The left-right relationship information estimation unit 220 receives a left channel crosstalk-added signal output from the delayed crosstalk addition unit 210 and a right channel crosstalk-added signal output from the delayed crosstalk addition unit 210. The left-right relationship information estimation unit 220 obtains and outputs a left-right correlation value γ and preceding channel information from the left channel crosstalk-added signal and the right channel crosstalk-added signal (step S220). The left-right relationship information estimation unit 220 performs the same processing as the left-right relationship information estimation unit 120 of the sound signal downmixing apparatus 100 according to the first embodiment using the left channel crosstalk-added signal instead of the left channel input sound signal and the right channel crosstalk-added signal instead of the right channel input sound signal.

That is, the left-right relationship information estimation unit 220 obtains preceding channel information that is information indicating which of the delayed crosstalk-added signals of two channels is preceding, and a left-right correlation value γ that is a value indicating the magnitude of the correlation between the delayed crosstalk-added signals of the two channels.

[Downmixing Unit 230]

The downmixing unit 230 receives the left channel input sound signal input to the sound signal downmixing apparatus 200, the right channel input sound signal input to the sound signal downmixing apparatus 200, the left-right correlation value γ output from the left-right relationship information estimation unit 220, and the preceding channel information output from the left-right relationship information estimation unit 220. The downmixing unit 230 obtains and outputs a downmix signal by performing weighted addition on the left channel input sound signal and the right channel input sound signal such that more of the input sound signal of the preceding channel of the left channel input sound signal and the right channel input sound signal is included in the downmix signal as the left-right correlation value γ becomes larger (step S230). That is, the downmixing unit 230 is the same as the downmixing unit 130 of the sound signal downmixing apparatus 100 according to the first embodiment except that the left-right correlation value γ and the preceding channel information obtained by the left-right relationship information estimation unit 220 instead of the left-right relationship information estimation unit 120 are used.

That is, based on the left-right correlation value γ and the preceding channel information, the downmixing unit 230 obtains a downmix signal by performing weighted addition on the input sound signals of the two channels such that more of the input sound signal of the preceding channel among the input sound signals of the two channels is included as the left-right correlation value becomes larger.

[Details of Delayed Crosstalk Addition Unit 210]

In a case where the sound emitted by the sound source is significantly included in the left channel input sound signal and is not significantly included in the right channel input sound signal (hereinafter also referred to as a “first case”), in order for the downmixing unit 230 to obtain a downmix signal useful for signal processing such as encoding processing, the downmixing unit 230 may obtain a signal mainly including the left channel input sound signal as a downmix signal. In order for the downmixing unit 230 to obtain a signal mainly including the left channel input sound signal as a downmix signal, it is sufficient that the left channel input sound signal is preceding and the left-right correlation value is a large value. In order for the left-right relationship information estimation unit 220 to obtain the preceding channel information and the left-right correlation value, in a case where the sound emitted by the sound source is significantly included in the left channel input sound signal and is not significantly included in the right channel input sound signal, it is sufficient that a signal processed such that the same signal as the left channel input sound signal is included in the right channel input sound signal later than the left channel input sound signal is regarded as the right channel input sound signal, and the left-right relationship information estimation unit 220 obtains the preceding channel information and the left-right correlation value.

In a case where the sound emitted by the sound source is significantly included in the right channel input sound signal and is not significantly included in the left channel input sound signal (hereinafter also referred to as a "second case"), in order for the downmixing unit 230 to obtain a downmix signal useful for signal processing such as encoding processing, the downmixing unit 230 may obtain a signal mainly including the right channel input sound signal as a downmix signal. In order for the downmixing unit 230 to obtain a signal mainly including the right channel input sound signal as a downmix signal, it is sufficient that the right channel input sound signal is preceding and the left-right correlation value is a large value. In order for the left-right relationship information estimation unit 220 to obtain the preceding channel information and the left-right correlation value, in a case where the sound emitted by the sound source is significantly included in the right channel input sound signal and is not significantly included in the left channel input sound signal, it is sufficient that a signal processed such that the same signal as the right channel input sound signal is included in the left channel input sound signal later than the right channel input sound signal is regarded as the left channel input sound signal, and the left-right relationship information estimation unit 220 obtains the preceding channel information and the left-right correlation value.

In other cases (that is, in neither the first case nor the second case), the left-right relationship information estimation unit 220 preferably obtains the preceding channel information and the left-right correlation value similarly to the left-right relationship information estimation unit 120 according to the first embodiment. That is, the processing of the signal described above needs to be processing of obtaining a large left-right correlation value in a case where the sound emitted by the sound source is significantly included in either the left channel input sound signal or the right channel input sound signal without affecting the left-right correlation value or the preceding channel information in a case where the sound emitted by the sound source is significantly included in both the left channel input sound signal and the right channel input sound signal. According to an experiment by the inventor, in this processing, it has been found that it is preferable to add a signal obtained by delaying the input sound signal of the other channel to the input sound signal of each channel with an amplitude of about 1/100. Here, it is not essential to set the amplitude to about 1/100, and at least the amplitude is only required to be reduced, and it is sufficient that how much the amplitude is reduced is determined in consideration of what kind of signals the left channel input sound signal and the right channel input sound signal are.

Therefore, for each channel, the delayed crosstalk addition unit 210 obtains a signal obtained by adding the input sound signal of one channel to a signal obtained by delaying the input sound signal of the other channel and multiplying the delayed input sound signal by a weight value that is a predetermined value having an absolute value smaller than 1, as the delayed crosstalk-added signal of the one channel. Specifically, the delayed crosstalk addition unit 210 obtains a signal obtained by adding the left channel input sound signal to a signal obtained by delaying the right channel input sound signal and multiplying the delayed signal by a weight value that is a predetermined value having an absolute value smaller than 1, as the left channel delayed crosstalk-added signal, and obtains a signal obtained by adding the right channel input sound signal to a signal obtained by delaying the left channel input sound signal and multiplying the delayed signal by a weight value that is a predetermined value having an absolute value smaller than 1, as the right channel delayed crosstalk-added signal. It is essential that the absolute value of the weight value is a value smaller than 1, and it is known that a value of about 0.01 is preferable according to an experiment of the inventor. However, it is sufficient that the weight value is a predetermined value in consideration of what kind of signals the left channel input sound signal and the right channel input sound signal are. Therefore, it is not essential to set the weight given to the delayed right channel input sound signal and the weight given to the delayed left channel input sound signal to the same value.

Note that the delay amount of the input sound signal of the other channel may be any delay amount as long as the left-right relationship information estimation unit 220 can obtain the above-described preceding channel information in the first case and the second case. In a case where the sound emitted by the sound source is significantly included in the left channel input sound signal and not significantly included in the right channel input sound signal, the delayed crosstalk addition unit 210 may set any value of positive values among the plurality of numbers of candidate samples $\tau_{cand}$ as a delay amount a such that the left channel input sound signal delayed by the delay amount a is included in the right channel delayed crosstalk-added signal in order for the left-right relationship information estimation unit 220 to obtain the preceding channel information indicating that the left channel is preceding, that is, in order to reliably set $\tau_{cand}$ when the correlation value is the maximum value to a positive value. Further, in a case where the sound emitted by the sound source is significantly included in the right channel input sound signal and not significantly included in the left channel input sound signal, the delayed crosstalk addition unit 210 may set an absolute value of any value of negative values among the plurality of numbers of candidate samples $\tau_{cand}$ as a delay amount a such that the right channel input sound signal delayed by the delay amount a is included in the left channel delayed crosstalk-added signal in order for the left-right relationship information estimation unit 220 to obtain the preceding channel information indicating that the right channel is preceding, that is, in order to reliably set $\tau_{cand}$ when the correlation value is the maximum value to a negative value. From the above, the delay amount of the left channel input sound signal in the right channel delayed crosstalk-added signal may be any value of positive values among the plurality of numbers of candidate samples $\tau_{cand}$, and the delay amount of the right channel input sound signal in the left channel delayed crosstalk-added signal may be an absolute value of any value of negative values among the plurality of numbers of candidate samples $\tau_{cand}$.

[First Example of Delayed Crosstalk Addition Unit 210]

Processing in the time domain will be described as a first example of the delayed crosstalk addition unit 210. In the first example, both the delay amount of the right channel input sound signal in the left channel delayed crosstalk-added signal and the delay amount of the left channel input sound signal in the right channel delayed crosstalk-added signal are preferably about one sample in order to prevent the left-right relationship information estimation unit 220 from deteriorating the accuracy of obtaining the left-right correlation value γ and the preceding channel information as much as possible without increasing the memory amount for the processing of the delayed crosstalk addition unit 210 and the algorithm delay by the processing of the delayed crosstalk addition unit 210 as much as possible. Therefore, in the first example, first, an example in which the delay amount is one sample will be described. When the number of samples per frame is T, the sample number is t, the sample numbers in the frame are from 1 to T, the left channel input sound signal sample with the sample number t is $x_L(t)$, the right channel input sound signal sample with the sample number t is $x_R(t)$, the left channel delayed crosstalk-added signal sample with the sample number t is $y_L(t)$, the right channel delayed crosstalk-added signal sample with the sample number t is $y_R(t)$, and the weight value is w, the delayed crosstalk addition unit 210 may obtain the left channel delayed crosstalk-added signals $y_L(1), y_L(2), \ldots, y_L(T)$ by the following Expression (2-1) for each frame, and obtain the right channel delayed crosstalk-added signals $y_R(1), y_R(2), \ldots, y_R(T)$ by the following Expression (2-2) for each frame.

[Math. 7]

$$y_L(t) = x_L(t) + w \times x_R(t-1) \tag{2-1}$$

[Math. 8]

$$y_R(t) = x_R(t) + w \times x_L(t-1) \tag{2-2}$$

Note that the delayed crosstalk addition unit 210 may include a storage unit (not illustrated), store the last sample of the left channel input sound signal of the immediately previous frame and the last sample of the right channel input sound signal of the immediately previous frame, use the last sample of the left channel input sound signal of the immediately previous frame as $x_L(0)$ in Expression (2-2) for the first sample of the left channel input sound signal of the frame to be processed, and use the last sample of the right channel input sound signal of the immediately previous frame as $x_R(0)$ in Expression (2-1) of the frame to be processed. Of course, the delayed crosstalk addition unit 210 may perform processing corresponding to Expression (2-2) with $x_L(Q)=0$ and processing corresponding to Expression (2-1) with $x_R(0)=0$. That is, for the first sample of the frame, the delayed crosstalk addition unit 210 may use the input sound signal without change as the delayed crosstalk-added signal for each channel.

Note that, in a case where the delayed crosstalk addition unit 210 performs processing in the time domain corresponding to the delay amount a (where a>0) that is not 1, it is sufficient that the above-described processing is performed using an expression in which t−1 in Expressions (2-1) and (2-2) is replaced with t−a. Here, the delay amounts in Expressions (2-1) and (2-2) do not need to be the same value, and the weight values in Expressions (2-1) and (2-2) do not need to be the same value. Accordingly, the delayed crosstalk addition unit 210 may set predetermined positive values to $a_1$ and $a_2$, and set predetermined values having an absolute value smaller than 1 to $w_1$ and $w_2$, and the delayed crosstalk addition unit 210 may obtain the left channel delayed crosstalk-added signals $y_L(1), y_L(2), \ldots, y_L(T)$ by the following Expression (2-1') for each frame and obtain the right channel delayed crosstalk-added signals $y_R(1), y_R(2), \ldots, y_R(T)$ by the following Expression (2-2') for each frame.

[Math. 9]

$$y_L(t) = x_L(t) + w_1 \times x_R(t-a_1) \tag{2-1'}$$

-continued

[Math. 10]

$$y_R(t) = x_R(t) + w_2 \times x_L(t-a_2) \tag{2-2'}$$

[Second Example of Delayed Crosstalk Addition Unit 210]

Processing in the frequency domain will be described as a second example of the delayed crosstalk addition unit 210. First, an example of processing in the frequency domain corresponding to the first example in which both the delay amount of the right channel input sound signal in the left channel delayed crosstalk-added signal and the delay amount of the left channel input sound signal in the right channel delayed crosstalk-added signal are one sample will be described. When the frequency number is k, the frequency numbers in the frame of the frequency spectrum are from 0 to T−1, the frequency spectrum sample of the left channel input sound signal with the frequency number k is $X_L(k)$, the frequency spectrum sample of the right channel input sound signal with the frequency number k is $X_R(k)$, the frequency spectrum sample of the left channel delayed crosstalk-added signal with the frequency number k is $Y_L(k)$, the frequency spectrum sample of the right channel delayed crosstalk-added signal with the frequency number k is $Y_R(k)$, and the weight value is w, the delayed crosstalk addition unit 210 may obtain the frequency spectra $X_L(0), X_L(1), \ldots, X_L(T-1)$ of the left channel input sound signal by Expression (1-1) for each frame, obtain the frequency spectra $X_R(0), X_R(1), \ldots, X_R(T-1)$ of the right channel input sound signal by Expression (1-2) for each frame, obtain frequency spectra $Y_L(0), Y_L(1), \ldots, Y_L(T-1)$ of the left channel delayed crosstalk-added signal by the following Expression (2-3) for each frame, and obtain frequency spectra $Y_R(0), Y_R(1), \ldots, Y_R(T-1)$ of the right channel delayed crosstalk-added signal by the following Expression (2-4) for each frame.

[Math. 11]

$$Y_L(k) = X_L(k) + w \times X_R(k) \times e^{-j\frac{2\pi}{T}k} \tag{2-3}$$

[Math. 12]

$$Y_R(k) = X_R(k) + w \times X_L(k) \times e^{-j\frac{2\pi}{T}k} \tag{2-4}$$

Note that, in a case where the delayed crosstalk addition unit 210 performs processing in the frequency domain corresponding to the delay amount a (where a>0) that is not 1, it is sufficient that the above-described processing is performed using an expression in which

[Math. 13]

$$e^{-j\frac{2\pi}{T}k}$$

in Expressions (2-3) and (2-4) is replaced with the following Expression.

[Math. 14]

$$e^{-j\frac{2a\pi}{T}k}$$

Here, the delay amounts in Expressions (2-3) and (2-4) do not need to be the same value, and the weight values in Expressions (2-3) and (2-4) do not need to be the same value. Accordingly, the delayed crosstalk addition unit 210 may set predetermined positive values to $a_1$ and $a_2$, and set predetermined values having an absolute value smaller than 1 to $w_1$ and $w_2$, and the delayed crosstalk addition unit 210 may obtain the frequency spectra $X_L(0)$, $X_L(1)$, . . . , $X_L(T-1)$ of the left channel input sound signal by Expression (1-1) for each frame, obtain the frequency spectra $X_R(0)$, $X_R(1)$, . . . , $X_R(T-1)$ of the right channel input sound signal by Expression (1-2) for each frame, obtain the frequency spectra $Y_L(0)$, $Y_L(1)$, . . . , $Y_L(T-1)$ of the left channel delayed crosstalk-added signal by the following Expression (2-3') for each frame, and obtain the frequency spectra $Y_R(0)$, $Y_R(1)$, . . . , $Y_R(T-1)$ of the right channel delayed crosstalk-added signal by the following Expression (2-4') for each frame.

[Math. 15]

$$Y_L(k) = X_L(k) + w_1 \times X_R(k) \times e^{-j\frac{2a_1\pi}{T}k} \quad (2\text{-}3')$$

[Math. 16]

$$Y_R(k) = X_R(k) + w_2 \times X_L(k) \times e^{-j\frac{2a_2\pi}{T}k} \quad (2\text{-}4')$$

Note that the frequency spectra $Y_L(0)$, $Y_L(1)$, . . . , $Y_L(T-1)$ and $Y_R(0)$, $Y_R(1)$, . . . , $Y_R(T-1)$ obtained by the delayed crosstalk addition unit 210 using Expressions (2-3) and (2-4) or Expressions (2-3') and (2-4') are frequency spectra obtained by performing Fourier transform on the left channel delayed crosstalk-added signals $y_L(1)$ $y_L(2)$, . . . , $y_L(T)$ and the right channel delayed crosstalk-added signals $y_R(1)$, $y_R(2)$, . . . , $y_R(T)$ in the time domain. Therefore, the delayed crosstalk addition unit 210 may output the frequency spectrum obtained by Expressions (2-3) and (2-4) or Expressions (2-3') and (2-4') as the delayed crosstalk-added signal in the frequency domain, the delayed crosstalk-added signal in the frequency domain output from the delayed crosstalk addition unit 210 may be input to the left-right relationship information estimation unit 220, and the left-right relationship information estimation unit 220 may use the input delayed crosstalk-added signal in the frequency domain as the frequency spectrum without a process of performing Fourier transform on the delayed crosstalk-added signal in the time domain to obtain the frequency spectrum.

Third Embodiment

An encoding apparatus that encodes a sound signal may include the sound signal downmixing apparatus according to the second embodiment described above as a sound signal downmixing unit, and this mode will be described as a third embodiment.

<<Sound Signal Encoding Apparatus 300>>

Figure 5:
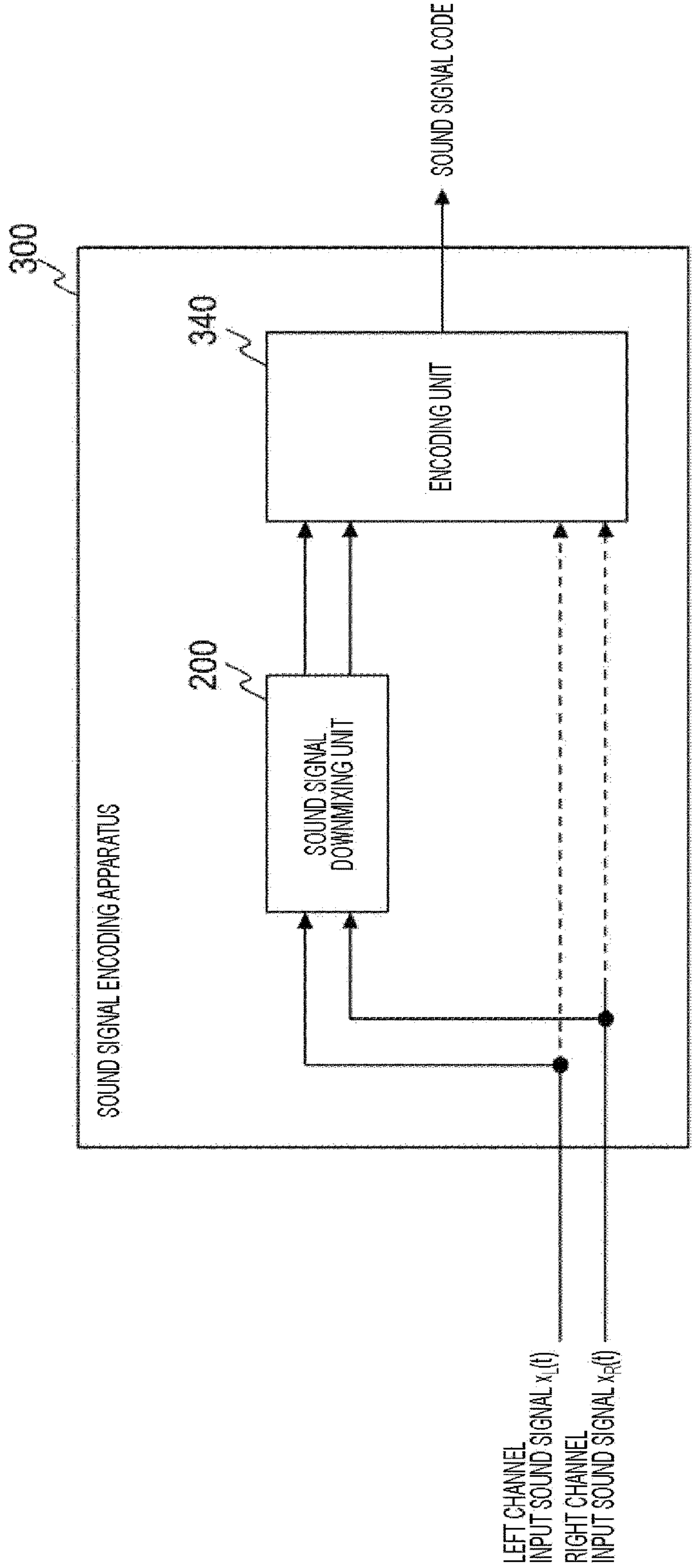
FIG. 5 is a block diagram illustrating an example of a sound signal encoding apparatus according to a third embodiment.
Figure 6:
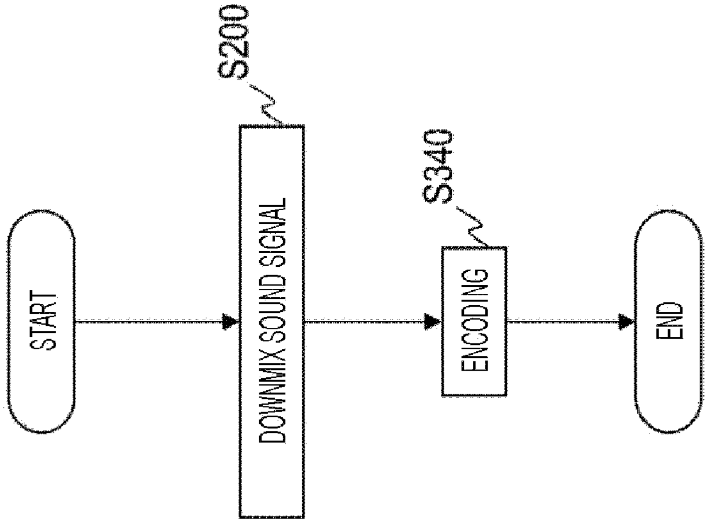
FIG. 6 is a flowchart illustrating an example of processing of the sound signal encoding apparatus according to the third embodiment.

As illustrated in FIG. 5, a sound signal encoding apparatus 300 according to the third embodiment includes a sound signal downmixing unit 200 and an encoding unit 340. The sound signal encoding apparatus 300 according to the third embodiment encodes the input sound signal in the time domain of the two-channel stereo in units of frames having a predetermined time length of 20 ms, for example, to obtain and output a sound signal code. The sound signal in the time domain of the two-channel stereo to be input to the sound signal encoding apparatus 300 is, for example, a digital vocal sound signal or an acoustic signal obtained by collecting sound such as vocal sound and music with each of the two microphones and performing AD conversion, and includes a left channel input sound signal and a right channel input sound signal. The sound signal code output from the sound signal encoding apparatus 300 is input to a sound signal decoding apparatus. The sound signal encoding apparatus 300 according to the third embodiment performs the processing of step S200 and step S340 illustrated in FIG. 6 for each frame. Hereinafter, the sound signal encoding apparatus 300 according to the third embodiment will be described with reference to the description of the second embodiment as appropriate.

[Sound Signal Downmixing Unit 200]

The sound signal downmixing unit 200 obtains and outputs a downmix signal from the left channel input sound signal and the right channel input sound signal input to the sound signal encoding apparatus 300 (step S200). The sound signal downmixing unit 200 is similar to the sound signal downmixing apparatus 200 according to the second embodiment, and includes a delayed crosstalk addition unit 210, a left-right relationship information estimation unit 220, and a downmixing unit 230. The delayed crosstalk addition unit 210 performs step S210 described above, the left-right relationship information estimation unit 220 performs step S220 described above, and the downmixing unit 230 performs step S230 described above. That is, the sound signal encoding apparatus 300 includes the sound signal downmixing apparatus 200 according to the second embodiment as the sound signal downmixing unit 200, and performs the processing of the sound signal downmixing apparatus 200 according to the second embodiment as step S200.

[Encoding Unit 340]

At least the downmix signal output from the sound signal downmixing unit 200 is input to the encoding unit 340. The encoding unit 340 at least encodes the input downmix signal to obtain and output a sound signal code (step S340). The encoding unit 340 may also encode the left channel input sound signal and the right channel input sound signal, and may include a code obtained by the encoding in the sound signal code and output the sound signal code. In this case, as indicated by a broken line in FIG. 5, the left channel input sound signal and the right channel input sound signal are also input to the encoding unit 340.

The encoding processing performed by the encoding unit 340 may be any encoding processing. For example, the downmix signals $x_M(1)$, $x_M(2)$, . . . , $x_M(T)$ of the input T samples may be encoded by a monaural encoding scheme such as the 3GPP EVS standard to obtain a sound signal code. Furthermore, for example, in addition to encoding the downmix signal to obtain a monaural code, the left channel input sound signal and the right channel input sound signal may be encoded by a stereo encoding scheme corresponding to a stereo decoding scheme of the MPEG-4 AAC standard to obtain a stereo code, and a combination of the monaural code and the stereo code may be output as a sound signal code. Furthermore, for example, in addition to encoding the downmix signal to obtain a monaural code, a stereo code may be obtained by encoding a difference or a weighted difference between the left channel input sound signal and the right channel input sound signal and the downmix signal for each channel, and a combination of the monaural code and the stereo code may be output as a sound signal code.

Fourth Embodiment

A signal processing apparatus that performs signal processing on a sound signal may include the sound signal downmixing apparatus according to the second embodiment described above as a sound signal downmixing unit, and this mode will be described as a fourth embodiment.

<<Sound Signal Processing Apparatus 400>>

Figure 7:
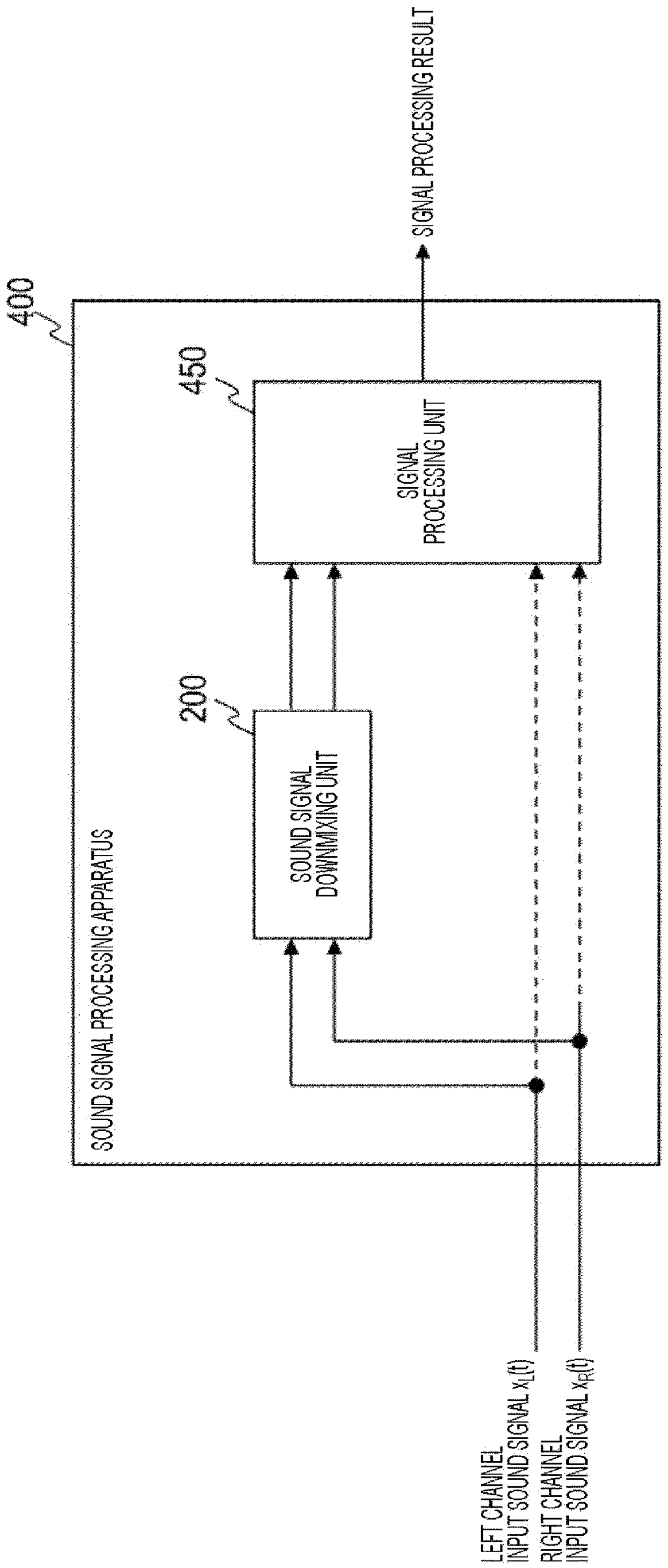
FIG. 7 is a block diagram illustrating an example of a sound signal processing apparatus according to a fourth embodiment.
Figure 8:
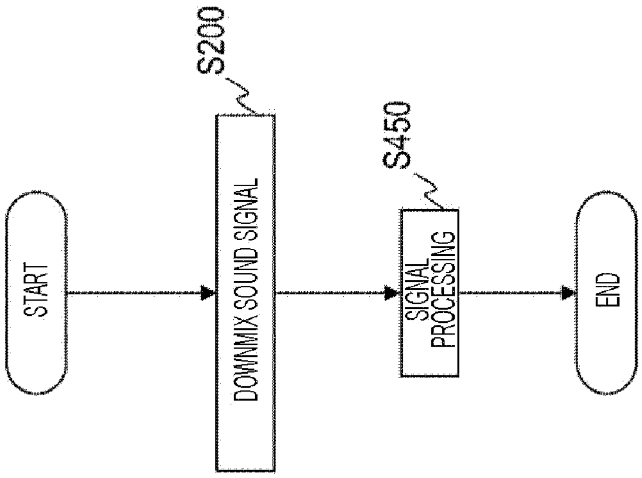
FIG. 8 is a flowchart illustrating an example of processing of the sound signal processing apparatus according to the fourth embodiment.

As illustrated in FIG. 7, a sound signal processing apparatus 400 according to the fourth embodiment includes a sound signal downmixing unit 200 and a signal processing unit 450. The sound signal processing apparatus 400 according to the fourth embodiment performs signal processing on the input sound signal in the time domain of the two-channel stereo in units of frames having a predetermined time length of 20 ms, for example, to obtain and output a signal processing result. The sound signal in the time domain of the two-channel stereo to be input to the sound signal processing apparatus 400 is, for example, a digital vocal sound signal or an acoustic signal obtained by collecting sound such as vocal sound or music with each of the two microphones and performing AD conversion, is, for example, a digital vocal sound signal or an acoustic signal obtained by processing the digital vocal sound signal or the acoustic signal, is, for example, a digital decoded vocal sound signal or a decoded acoustic signal obtained by decoding a stereo code by the stereo decoding apparatus, and includes a left channel input sound signal and a right channel input sound signal. The sound signal processing apparatus 400 according to the fourth embodiment performs the processing of step S200 and step S450 illustrated in FIG. 8 for each frame. Hereinafter, the sound signal processing apparatus 400 according to the fourth embodiment will be described with reference to the description of the second embodiment as appropriate.

[Sound Signal Downmixing Unit 200]

The sound signal downmixing unit 200 obtains and outputs a downmix signal from the left channel input sound signal and the right channel input sound signal input to the sound signal processing apparatus 400 (step S200). The sound signal downmixing unit 200 is similar to the sound signal downmixing apparatus 200 according to the second embodiment, and includes a delayed crosstalk addition unit 210, a left-right relationship information estimation unit 220, and a downmixing unit 230. The delayed crosstalk addition unit 210 performs step S210 described above, the left-right relationship information estimation unit 220 performs step S220 described above, and the downmixing unit 230 performs step S230 described above. That is, the sound signal processing apparatus 400 includes the sound signal downmixing apparatus 200 according to the second embodiment as the sound signal downmixing unit 200, and performs the processing of the sound signal downmixing apparatus 200 according to the second embodiment as step S200.

[Signal Processing Unit 450]

At least the downmix signal output from the sound signal downmixing unit 200 is input to the signal processing unit 450. The signal processing unit 450 performs at least signal processing on the input downmix signal to obtain and output a signal processing result (step S450). The signal processing unit 450 may also perform signal processing on the left channel input sound signal and the right channel input sound signal to obtain a signal processing result. In this case, as indicated by a broken line in FIG. 7, the left channel input sound signal and the right channel input sound signal are also input to the signal processing unit 450, and the signal processing unit 450 performs, for example, signal processing using a downmix signal on the input sound signal of each channel to obtain the output sound signal of each channel as a signal processing result.

<Program and Recording Medium>

Figure 9:
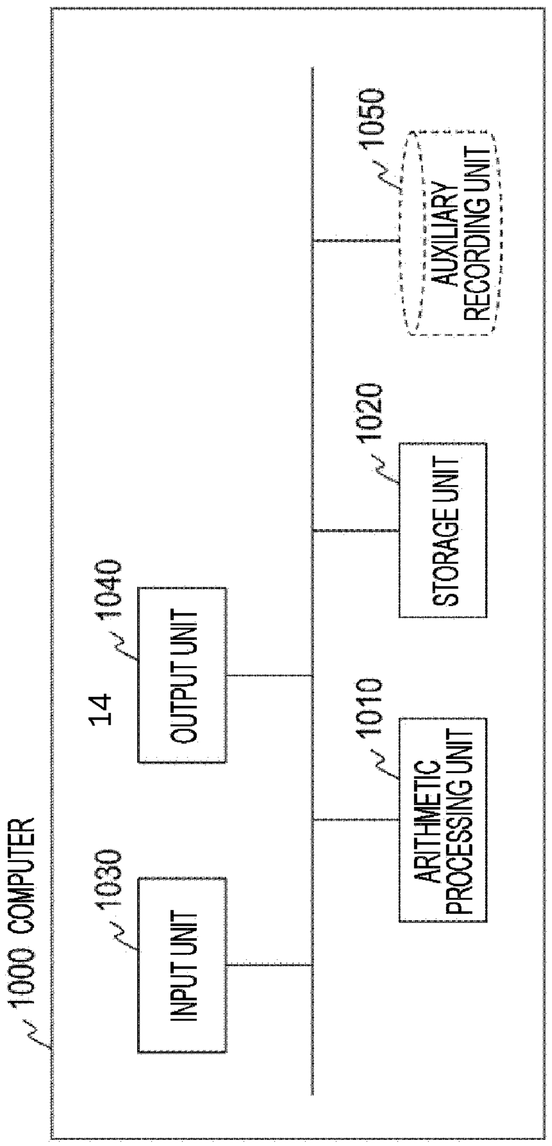
FIG. 9 is a diagram illustrating an example of a functional configuration of a computer that implements each device according to an embodiment of the present invention.

Processing of each unit of each of the sound signal downmixing apparatus, the sound signal encoding apparatus, and the sound signal processing apparatus described above may be implemented by a computer, and in this case, processing contents of functions that each device should have are described by a program. By causing a storage unit 1020 of a computer 1000 illustrated in FIG. 9 to read this program and causing an arithmetic processing unit 1010, an input unit 1030, an output unit 1040, and the like to execute the program, various processing functions in each of the foregoing devices are implemented on the computer.

The program in which the processing details are written may be recorded on a computer-readable recording medium. The computer-readable recording medium is, for example, a non-transitory recording medium and is specifically a magnetic recording device, an optical disc, or the like.

Also, distribution of the program is performed by, for example, selling, transferring, or renting a portable recording medium such as a DVD and a CD-ROM on which the program is recorded. Further, a configuration in which the program is stored in a storage device in a server computer and the program is distributed by transferring the program from the server computer to other computers via a network may also be employed.

For example, the computer that performs such a program first temporarily stores the program recorded in a portable recording medium or the program transferred from the server computer in an auxiliary recording unit 1050 that is a non-transitory storage device of the computer. Then, at the time of performing processing, the computer reads the program stored in the auxiliary recording unit 1050 that is the non-temporary storage device of the computer into the storage unit 1020 and performs processing in accordance with the read program. In addition, as another embodiment of the program, the computer may directly read the program from the portable recording medium into the storage unit 1020 and perform processing in accordance with the program, and furthermore, the computer may sequentially perform processing in accordance with a received program each time the program is transferred from the server computer to the computer. In addition, the above-described processing may be performed by a so-called application service provider (ASP) type service that implements a processing function only by a performance instruction and result acquisition without transferring the program from the server computer to the computer. Note that the program in this mode includes information that is used for processing by an electronic computer and is equivalent to the program (data or the like that is not a direct command to the computer but has a property that defines processing of the computer).

Although the present devices are each configured by performing a predetermined program on a computer in the present embodiment, at least part of the processing content may be implemented by hardware.

In addition, it is needless to say that modifications can be appropriately made without departing from the gist of the present invention.

The invention claimed is:

1. A sound signal downmixing method for obtaining a downmix signal that is a monaural sound signal from input sound signals of two channels, the method comprising:

a delayed crosstalk addition step of obtaining, for each of the two channels, a signal obtained by adding an input sound signal of one channel to a signal obtained by delaying an input sound signal of the other channel and multiplying the delayed input sound signal by a weight value that is a predetermined value having an absolute value smaller than 1, as a delayed crosstalk-added signal of the one channel;

a left-right relationship information acquisition step of obtaining preceding channel information that is information indicating which of the delayed crosstalk-added signals of the two channels is preceding and a left-right correlation value that is a value indicating a magnitude of correlation between the delayed crosstalk-added signals of the two channels; and a downmixing step of obtaining the downmix signal by performing weighted addition on the input sound signals of the two channels based on the left-right correlation value and the preceding channel information such that more of a signal derived from an input sound signal of a preceding channel among the signals derived from the input sound signals of the two channels is included as the left-right correlation value becomes larger.

2. The sound signal downmixing method according to claim 1, wherein, in the delayed crosstalk addition step, when the input sound signals of the two channels are respectively a left channel input sound signal and a right channel input sound signal, the delayed crosstalk-added signals of the two channels are respectively a left channel delayed crosstalk-added signal and a right channel delayed crosstalk-added signal, a sample number is t, each sample of the left channel input sound signal is $x_L(t)$, each sample of the right channel input sound signal is $x_R(t)$, each sample of the left channel delayed crosstalk-added signal is $y_L(t)$, each sample of the right channel delayed crosstalk-added signal is $y_R(t)$, predetermined positive values are $a_1$ and a2, and predetermined values having an absolute value smaller than 1 are $w_1$ and w2, each sample $y_L(t)$ of the left channel delayed crosstalk-added signal is obtained by the following expression, and

[Math. 17]

$$y_L(t) = x_L(t) + w_1 \times x_R(t - a_1)$$

each sample $y_R(t)$ of the right channel delayed crosstalk-added signal is obtained by the following expression,

[Math. 18]

$$y_R(t) = x_R(t) + w_2 \times x_L(t - a_2).$$

3. The sound signal downmixing method according to claim 1, wherein, in the delayed crosstalk addition step, when the input sound signals of the two channels are respectively a left channel input sound signal and a right channel input sound signal, the delayed crosstalk-added signals of the two channels are respectively a left channel delayed crosstalk-added signal and a right channel delayed crosstalk-added signal, a frequency number is k, each frequency spectrum sample of a frequency spectrum obtained by performing Fourier transform on the left channel input sound signal for each frame is $X_L(k)$, each frequency spectrum sample of a frequency spectrum obtained by performing Fourier transform on the right channel input sound signal for each frame is $X_R(k)$, each frequency spectrum sample of the left channel delayed crosstalk-added signal in a frequency domain for each frame is $Y_L(k)$, each frequency spectrum sample of the right channel delayed crosstalk-added signal in the frequency domain for each frame is $Y_R(k)$, predetermined positive values are $a_1$ and $a_2$, and predetermined values having an absolute value smaller than 1 are $w_1$ and $w_2$, each frequency spectrum sample $Y_L(k)$ of the left channel delayed crosstalk-added signal in the frequency domain for each frame is obtained by the following expression, and

[Math. 19]

$$Y_L(k) = X_L(k) + w_1 \times X_R(k) \times e^{-j\frac{2a_1\pi}{T}k}$$

each frequency spectrum sample $Y_R(k)$ of the right channel delayed crosstalk-added signal in the frequency domain for each frame is obtained by the following expression,

[Math. 20]

$$Y_R(k) = X_R(k) + w_2 \times X_L(k) \times e^{-j\frac{2a_2\pi}{T}k}.$$

4. A sound signal encoding method comprising the sound signal downmixing method according to claim 1 as a sound signal downmixing step, wherein the sound signal encoding method further comprises:

a monaural encoding step of encoding the downmix signal obtained in the downmixing step to obtain a monaural code; and a stereo encoding step of encoding the input sound signals of the two channels to obtain a stereo code.

5. A non-transitory computer readable medium that stores a program for causing a computer to execute processing of each step of the sound signal encoding method according to claim 4.

6. A non-transitory computer readable medium that stores a program for causing a computer to execute processing of each step of the sound signal downmixing method according to claim 1.

7. A sound signal downmixing apparatus for obtaining a downmix signal that is a monaural sound signal from input sound signals of two channels, the sound signal downmixing apparatus comprising processing circuitry configured to:

obtain, for each of the two channels, a signal obtained by adding an input sound signal of one channel to a signal obtained by delaying an input sound signal of the other channel and multiplying the delayed input sound signal by a weight value that is a predetermined value having an absolute value smaller than 1, as a delayed crosstalk-added signal of the one channel;

obtain preceding channel information that is information indicating which of the delayed crosstalk-added signals of the two channels is preceding and a left-right correlation value that is a value indicating a magnitude of correlation between the delayed crosstalk-added signals of the two channels; and obtain the downmix signal by performing weighted addition on the input sound signals of the two channels based on the left-right correlation value and the preceding channel information such that more of a signal derived from an input sound signal of a preceding channel among the signals derived from the input sound signals of the two channels is included as the left-right correlation value becomes larger.

8. The sound signal downmixing apparatus according to claim 7, wherein, in the processing circuitry, when the input sound signals of the two channels are respectively a left channel input sound signal and a right channel input sound signal, the delayed crosstalk-added signals of the two channels are respectively a left channel delayed crosstalk-added signal and a right channel delayed crosstalk-added signal, a sample number is t, each sample of the left channel input sound signal is $x_L(t)$, each sample of the right channel input sound signal is $x_R(t)$, each sample of the left channel delayed crosstalk-added signal is $y_L(t)$, each sample of the right channel delayed crosstalk-added signal is $y_R(t)$, predetermined positive values are $a_1$ and $a_2$, and predetermined values having an absolute value smaller than 1 are $w_1$ and $w_2$, each sample $y_L(t)$ of the left channel delayed crosstalk-added signal is obtained by the following expression, and

[Math. 21]

$$y_L(t) = x_L(t) + w_1 \times x_R(t - a_1)$$

each sample $y_R(t)$ of the right channel delayed crosstalk-added signal is obtained by the following expression,

[Math. 22]

$$y_R(t) = x_R(t) + w_2 \times x_L(t - a_2).$$

9. The sound signal downmixing apparatus according to claim 7, wherein, in the processing circuitry, when the input sound signals of the two channels are respectively a left channel input sound signal and a right channel input sound signal, the delayed crosstalk-added signals of the two channels are respectively a left channel delayed crosstalk-added signal and a right channel delayed crosstalk-added signal, a frequency number is k, each frequency spectrum sample of a frequency spectrum obtained by performing Fourier transform on the left channel input sound signal for each frame is $X_L(k)$, each frequency spectrum sample of a frequency spectrum obtained by performing Fourier transform on the right channel input sound signal for each frame is $X_R(k)$, each frequency spectrum sample of the left channel delayed crosstalk-added signal in a frequency domain for each frame is $Y_L(k)$, each frequency spectrum sample of the right channel delayed crosstalk-added signal in the frequency domain for each frame is $Y_R(k)$, predetermined positive values are $a_1$ and $a_2$, and predetermined values having an absolute value smaller than 1 are $w_1$ and $w_2$, each frequency spectrum sample $Y_L(k)$ of the left channel delayed crosstalk-added signal in the frequency domain for each frame is obtained by the following expression, and

[Math. 23]

$$Y_L(k) = X_L(k) + w_1 \times X_R(k) \times e^{-j\frac{2a_1\pi}{T}k}$$

each frequency spectrum sample $Y_R(k)$ of the right channel delayed crosstalk-added signal in the frequency domain for each frame is obtained by the following expression,

[Math. 24]

$$Y_R(k) = X_R(k) + w_2 \times X_L(k) \times e^{-j\frac{2a_2\pi}{T}k}.$$

10. A sound signal encoding apparatus comprising the sound signal downmixing apparatus according to claim 7, wherein the sound signal encoding apparatus further comprises processing circuitry configured to:

encode the downmix signal obtained by the downmixing unit to obtain a monaural code; and encode the input sound signals of the two channels to obtain a stereo code.

* * * * *